US008989057B2

(12) United States Patent
Chen et al.

(10) Patent No.: US 8,989,057 B2
(45) Date of Patent: *Mar. 24, 2015

(54) SELECTIVE TELECONFERENCE INTERRUPTION

(75) Inventors: Yen-Fu Chen, Austin, TX (US); John H. Bosma, Austin, TX (US); Robyn L Focazio, Austin, TX (US); Keith R Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 13/569,402

(22) Filed: Aug. 8, 2012

(65) Prior Publication Data
US 2013/0021950 A1 Jan. 24, 2013

Related U.S. Application Data

(63) Continuation of application No. 11/249,939, filed on Oct. 13, 2005, now Pat. No. 8,305,939.

(51) Int. Cl.
*H04L 12/16* (2006.01)
*H04L 29/06* (2006.01)
*H04L 12/18* (2006.01)
*H04M 3/56* (2006.01)
*H04M 7/00* (2006.01)
*H04M 3/42* (2006.01)

(52) U.S. Cl.
CPC .......... *H04L 65/403* (2013.01); *H04L 12/1822* (2013.01); *H04M 3/56* (2013.01); *H04M 3/566* (2013.01); *H04M 7/0063* (2013.01)
USPC ..................... 370/260; 379/202.01

(58) Field of Classification Search
USPC ...................... 379/202.01; 370/260
See application file for complete search history.

(56) References Cited

U.S. PATENT DOCUMENTS

| 6,178,237 | B1 | 1/2001 | Horn |
| 6,792,092 | B1 | 9/2004 | Michaelewicz |
| 6,888,935 | B1 | 5/2005 | Day, Jr. |
| 6,978,001 | B1 | 12/2005 | Shaffer et al. |
| 2003/0194072 | A1 | 10/2003 | MacNamara et al. |

(Continued)

OTHER PUBLICATIONS

Cunningham; "In Band Signal: Definition of In Band Signaling"; retrieved on Mar. 8, 2010 from http://::/c2.com/cgi/wiki?InBandSignal.

(Continued)

*Primary Examiner* — Duc Nguyen
*Assistant Examiner* — Assad Mohammed
(74) *Attorney, Agent, or Firm* — Robert H. Frantz; John R. Pivnichny

(57) ABSTRACT

A system and method for controlling a peer-to-peer, unmoderated conference call, which allows a non-talking conferee to send an in-band interrupt request signal which is detected by the conference bridge, which automatically determines which conferee is currently talking, and continuously sends an alert signal to the talking conferee, but prevents transmission of alert signal and interrupt request signal to all other, non-speaking conferees. When the talking conferee quits talking, or acknowledges the interrupt request, or a timeout occurs, alert signal is discontinued, and the request conferee (or another conferee) may speak. Optionally, after a timeout occurs, the voice of the currently speaking conferee is removed from the conference summation, effectively muting the non-yielding conferee.

21 Claims, 9 Drawing Sheets

(56) References Cited

U.S. PATENT DOCUMENTS

| | | |
|---|---|---|
| 2003/0231746 A1 | 12/2003 | Hunter et al. |
| 2003/0235184 A1 | 12/2003 | Dorenbosch et al. |
| 2003/0235277 A1 | 12/2003 | Fuller et al. |
| 2004/0127233 A1 | 7/2004 | Harris et al. |
| 2005/0032539 A1 | 2/2005 | Noel et al. |
| 2006/0126538 A1 | 6/2006 | Krstulich |

OTHER PUBLICATIONS

Generalservicesadministrationinformationtechnologyservices;Federal Standard 1037C; "Telecommunications: Glossary of Telecommunication Terms: Definition of In Band Signaling"; retrieved on Mar. 8, 2010 from http://www.its.bldrdoc.gov/fs/gifs/37c-cov.gif.

Whatis.com;"In Band Signaling"; retrieved on Mar. 8, 2010 from http://searchnetworking.techtarget.com/.

Businesswire;"Wildfire Communications Enhances Virtual Assistant Product Suite Using SpeechWorks' Technology"; Jan. 23, 2002; retrieved on Jan. 21, 2011 from http://findarticles.com.

Globalconferencecall; "Conferencing F.A.Q.'s"; retrieved on Jan. 21, 2011 from http://www.globalconferencecall.com/faq.htm.

Voceracommunications; "Vocera 3.1 Command Reference";retrieved on Jan. 21, 2011 from http://it.med.miami.edu/documents.

USPTO and Chen; examination correspondence from related U.S. Appl. No. 11/249,939, filed Oct. 13, 2005 by Yen-Fu Chen.

SELECTIVE TELECONFERENCE INTERRUPTION

This is a continuation application of U.S. patent application Ser. No. 11/249,939, filed on Oct. 13, 2005 by Yen-Fu Chen, which is currently under notice of allowance.

BACKGROUND OF THE INVENTION

1. Field of the Invention

This invention relates to methods and systems for managing teleconferences.

2. Background of the Invention

Conference calls, or "teleconferences" are well known in the art, and have become a staple technology in all types of businesses. Conference calls can be arranged quicker than a physical meeting, especially in situations where one or more parties are remotely located from the meeting site. Savings of travel costs, and time in transit, are also key advantages to conference calls when compared to traditional, on-site or "in-person" meetings.

Traditional telephone-based, audio-only conference calls are quite common. Newer embodiments which use the Internet and voice-over-Internet Protocol ("VoIP") for audio and sometimes video conferences are also gaining popularity.

Typically, a conference call is provided by a centralized service. Prior to the conference call, conferees are provided with a "call in number" and a meeting code, such as a PIN code.

During conference calls through a teleconferencing center, sometimes it is necessary for a listening conferee to interrupt whoever is currently talking In this situation where it isn't practical or desired to wait for a lull in the discussion, the interrupter is going to use some method to interrupt the speaker. There are several methods people use to interrupt in conference calls known in the art.

First, the interrupter can use their voice, spoken loudly, so as to be heard over the speaking conferee's voice. For example, the interrupter might ask loudly, "Can I say something?!?" Sometimes, however, multiple attempts may be required before the speaking conferee hears the request, especially if the speaking conferee uses a half-duplex phone. Meanwhile, all other conferees on the conference call hear both the interrupter and the speaking conferee at the same time, which is distracting and often very annoying.

In a second approach, the interrupter can press a key on their phone pad to send a dual-tone multi-frequency ("DTMF") tone, also known in the U.S. marketplace as "touch tone"™, which is transmitted to all other conferees, including the speaking conferee. Typically the tone only needs to be brief, and so is less distracting than interrupting with a loud voice, but this method is still a distraction to the other conferees. Furthermore, if the speaker uses a half-duplex phone, the signal would either have to be timed coincidentally at just the right moment, or, the interrupter would need to keep pressing the key or hold it down until the speaker pauses long enough to be able to hear it. This extended tone is audible to everyone except the speaker, and so it is distracting.

In yet another approach which has developed in customary usage of conference calls, the interrupter uses some means external to the conference call (e.g. out-of-band of the voice conference signal), such as sending an instant message, calling from and to a different phone, or running down the office hall to tell the speaker they need a turn speaking. This is inconvenient at the least, and may not be available in all situations.

"Moderated conferences" are special conference calls in which one of the members of the conference can control which conferee can speak, all others being muted. Conferees who desire to speak in the conference, such as to ask questions, may signal this desire by pressing a certain key combination, which signals the conference moderator, who may or may not un-mute the requester.

However, the model of moderated conferences applies well to presentation-style teleconferences when it is expected that one conferee, the "presenter", will be talking the most, and when most of the other conferees are not expected to speak much or at all. If there are a lot of requests to speak, it can become burdensome and incur delays in the natural flow of conversation to have the moderator explicitly select speakers. Additionally, if a conferee wishes to speak but the moderator does not un-mute the requester's microphone, the requester can become frustrated. Further, moderated conferences typically incur higher fees, and so may be discouraged for budgetary reasons even if appropriate for the nature of the conference call.

SUMMARY OF THE INVENTION

The present invention provides a system, preferably implemented at teleconferencing centers, which detects which line belongs to a currently speaking conferee, intercepts or detects an interrupt request signal, such as DTMF tone or a voice-recognized command word or phrase, received from any of the other conferees, and routes such tones to the speaker's line exclusively, while blocking transmission of the interrupt request signal to the other conferees.

For the purposes of this disclosure, we will refer to signals transmitted in the audible frequency band along with audible conference signals as "in-band" signaling. Methods of signaling conditions related to the conference call which are not sent "in-band", such as sending an email, instant message, or calling on another telephone line, will be referred to as "out-of-band" signaling.

Further, for the purposes of this disclosure, we will refer to conference calls which are unmoderated as peer-to-peer conference calls, in which each conferee has the same amount of control over selection of the speaking party as each other conferee. Conference calls in which at least one party has significantly more or sole control over selection of the speaking conferee will be referred to as moderated conference calls.

According to one embodiment of the present invention, the interrupt request signal is continuously transmitted to the currently speaking conferee tone until the speaking conferee goes silent, or the speaker acknowledges the interrupt by pressing their own key pad, which is preferably filtered by the system and sent only to the interrupt requester. The latter is an important advantage of the invention because there may be times when the speaker refuses to immediately allow the interruption, and so, in that case, they need a way to turn off the tone and let the interrupter know that their interruption has been heard.

According to another embodiment of the present invention, the system detects the transmission of an interrupt request signal from a non-speaking conferee, and sets a timer while sending the interrupt request tone to the speaking conferee. If the speaking conferee does not yield the conference by the time the timer expires, the invention automatically mutes the speaking conferee's signal in the conference, thereby forcing the availability of the conference to other parties.

Advantages of the present invention include that it removes all other participants from the current interruption process, and thus distraction and annoyance is reduced or eliminated. Further advantages include:

(a) The invention provides a simple method to interrupt the speaking conferee. A phone key or combination is all that is required to signal a desire to interrupt, and the system automatically handles the signal in a manner which is more effective and less disruptive.

(b) The invention provides a signal which can be readily ignored or acknowledged by the speaking conferee. Rather than having someone try to interrupt by speaking at the same time, speakers can continue talking through the tone until they feel it is appropriate to allow the interruption. Alternatively, they can acknowledge the interrupt request without taking extra time to say, "Let me finish this thought first, and then you can talk", also avoiding the disruption to the flow of conversation that would create.

(c) The invention is lower cost to implement, and readily deployed. The system requires enhancements to the teleconferencing center only, not to everyone's telephone.

In general, the method of the present invention can be summarized as the following steps.

Step 1: Make Interruption Request.

To initiate an interruption request, the interrupter presses a key or key combination. For example, the star (*) then one (1) or other combination could be designated to trigger the interrupt. This prevents sending an interruption request if a participant accidentally bumps into one key.

The interrupter does not need to continue holding down the key combination in half-duplex circumstances. The system will continue notifying the speaker until appropriate.

In an alternative embodiment, a voice recognition unit or resource can be applied to the non-speaking conferees lines in order to allow specific spoken command words or phrases to be used as an interrupt request signal, such as "Excuse me", or "May I Speak".

Step 2: Intercept Interruption Request.

The enhanced teleconference center intercepts the tones created by pressing the key or key combination, and filters out the tones to be broadcast to participant lines. If usability studies show participants prefer to know someone is trying to interrupt, then it could simply reduce the volume of the tone to be broadcast such that people can hear it at a reduced volume. The technology to filter is sometimes used to intercept a key combination to mute participant lines. The technology to reduce the volume is sometimes used to normalize (although much simpler than normalization). With this invention, the tones intercepted would initiate the interruption process.

Step 3: Detect Speaker Line.

When the conversation interrupt request is received, the invention samples all the signals from all of the conferees over a brief period (such as a few seconds—the optimal range can be adjusted based on studies), and then compares the digital representation of the frequencies to determine which line is the speaker's. The line with the most noise is determined to be the currently speaking conferee's line. In some teleconferencing systems, other filters and summation units will track which conferee is currently speaking, so in such implementations, this signal or status can be used in place of detecting the currently speaking conferee.

Step 4: Notify Speaker of Interruption Request.

Next, the system sends a tone to the speaking conferee's line, or a pre-recorded voice message, such as "A participant would like to interrupt you."

Step 5: Process The Speaker's Response.

There are generally two ways the speaker can instruct the system to complete the interruption request process.

(1) Yielding the Floor. The speaking conferee can yield the conference by simply ceasing to speak. The system continues to sample the speaker's line to see if it is has gone silent for a brief period of time. When the speaker's line has gone silent (quiet in relation to other lines) while another line is active, the interruption request is considered complete.

It is possible that someone other than the interrupter has taken control of the conversation, but that doesn't matter, as the interruption was successful and now the interrupter can decide if they want to interrupt the new speaker. In other words, this isn't meant to be a system that enforces who has a right to speak, unlike a moderated conference call.

(2) Speaker Acknowledgment. The second disposition method is to signal acknowledgment by the speaking conferee of the interrupt request. This is preferably done by the speaker pressing their own key combination, which can even be the same combination as the interrupt request combination.

In this case, the speaker decides they want to finish their thought, and rather than ignore the request or digress from the conversation, they tell the system to handle it. So, the system intercepts the tones generated, filters them out, and then sends them only to the line of the interrupter, but not to the other conferees. This way, the interrupter knows their request has been received.

According to one embodiment of the invention, between the time of notifying the speaker of the interruption request until the interruption request is complete, the system may perform two operations. First, it can ignore other interrupt requests because there is no need for redundancy. After all, this isn't a system where the speaker needs to know how many people want a turn, only that someone else wants a turn. Second, the system can continue to notify the speaker in case the speaker did not hear the initial interruption request, such as if they are using a half-duplex phone. This continual notification can be implemented either as a periodic tone send or a continual tone send.

BRIEF DESCRIPTION OF THE DRAWINGS

The following detailed description when taken in conjunction with the figures presented herein provide a complete disclosure of the invention.

DESCRIPTION OF THE INVENTION

We will now disclose one or more example embodiments for better understanding of the present invention. While the following descriptions and discussion will be related to audio-only conferences, and especially to telephone-based audio-only conferences, it will be readily recognized by those skilled in the art that the present invention may be employed in various embodiments to enhance other types of conferences, including but not limited to Internet-based audio-only conferences, and video conferences.

Figure 3:
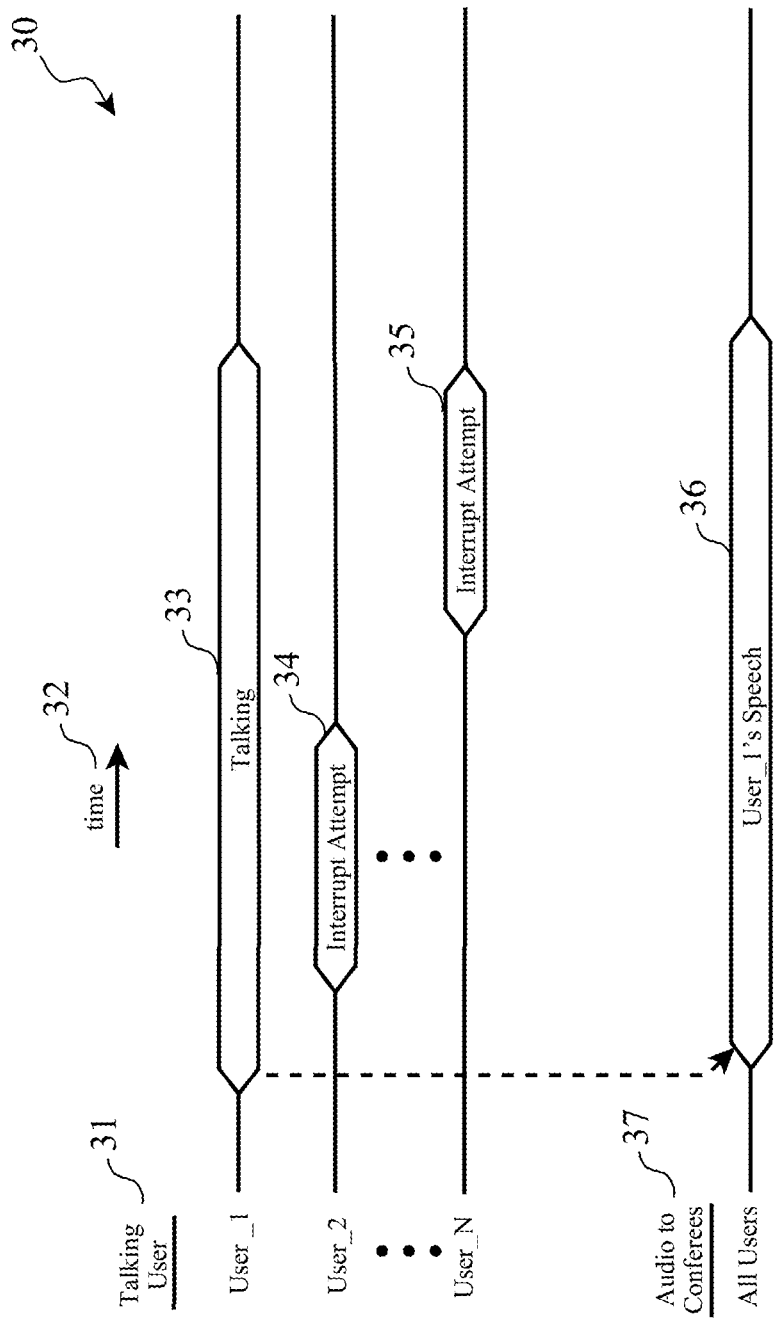
FIG. 3 illustrates in a time line format the problem of trying to interrupt a talking party in a traditionally controlled conferee call.

Turning to FIG. 3, a time diagram (30) in which time progresses from left to right (32) is shown for a traditional conference call, during which a first user USER_1 is talking (31) for a period of time (33). During this time, the voice signal from USER_1 is broadcast (36) to all of the other members (37) of the conference.

Customarily, if another potential speaker, such as USER_2 wished to interrupt, he or she would also speak for a period of time (34), or press a DTMF key, in the hopes that the concurrently speaking conferee, USER_1, would hear them interrupting and would yield the conversation (e.g. quit talking).

However, if the currently speaking conferee is using a half-duplex terminal (e.g. phone, web browser, etc.), or if the interrupting conferee is not sufficiently loud to overcome the sound of the currently speaking conferee's voice, the interrupt attempt may be unsuccessful, as well as other attempts (35) may also be unsuccessful.

Figure 4:
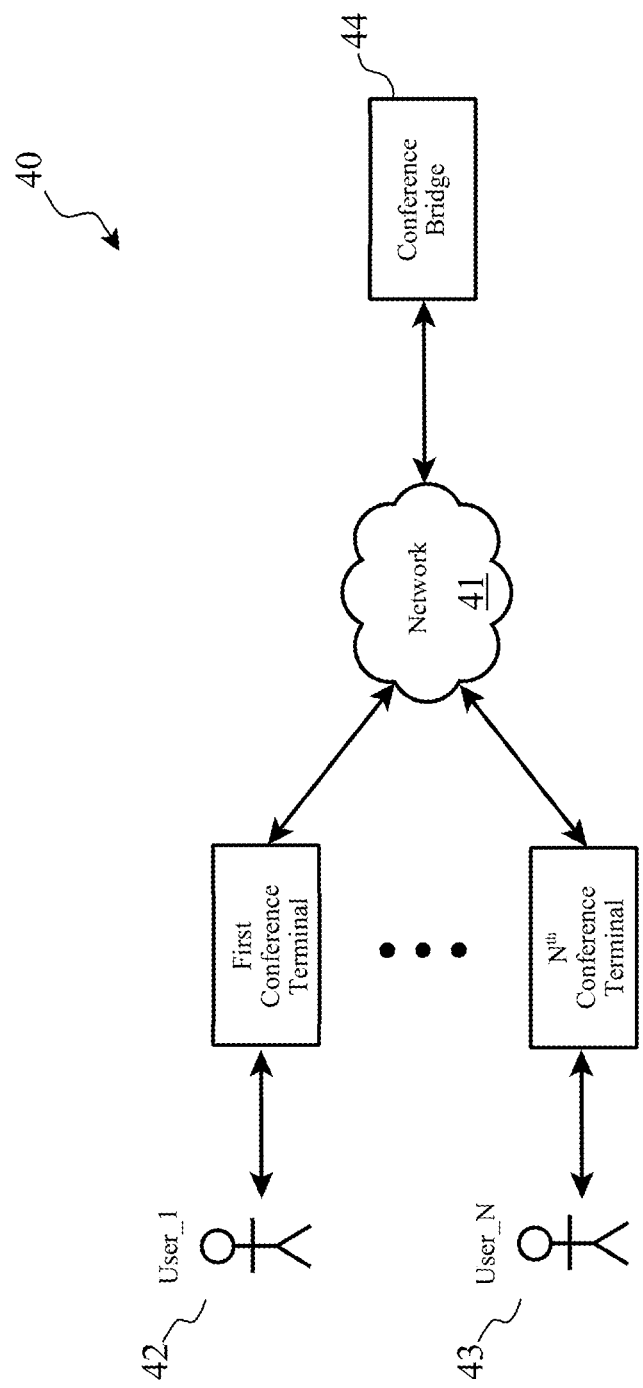
FIG. 4 sets forth a general system arrangement of components involved in a conference call.

To better understand the solution provided by the present invention, it is useful to review some basic operations of such traditional teleconferencing systems. As shown (40) in FIG. 4, a conference bridge (44) is interconnected by a network (41) to a number of terminals (42 . . . 43) being used by a number of users. The terminals are most often telephones or wireless phones, but can also include video conferencing terminals, web browsers, and the like. As such, the Public Switched Telephone Network ("PSTN") is the most common type of network employed during conferencing, but other arrangements include, but are not limited to, the Internet, an Intranet, and a Virtual Private Network ("VPN").

Conference Bridges

Figure 5:
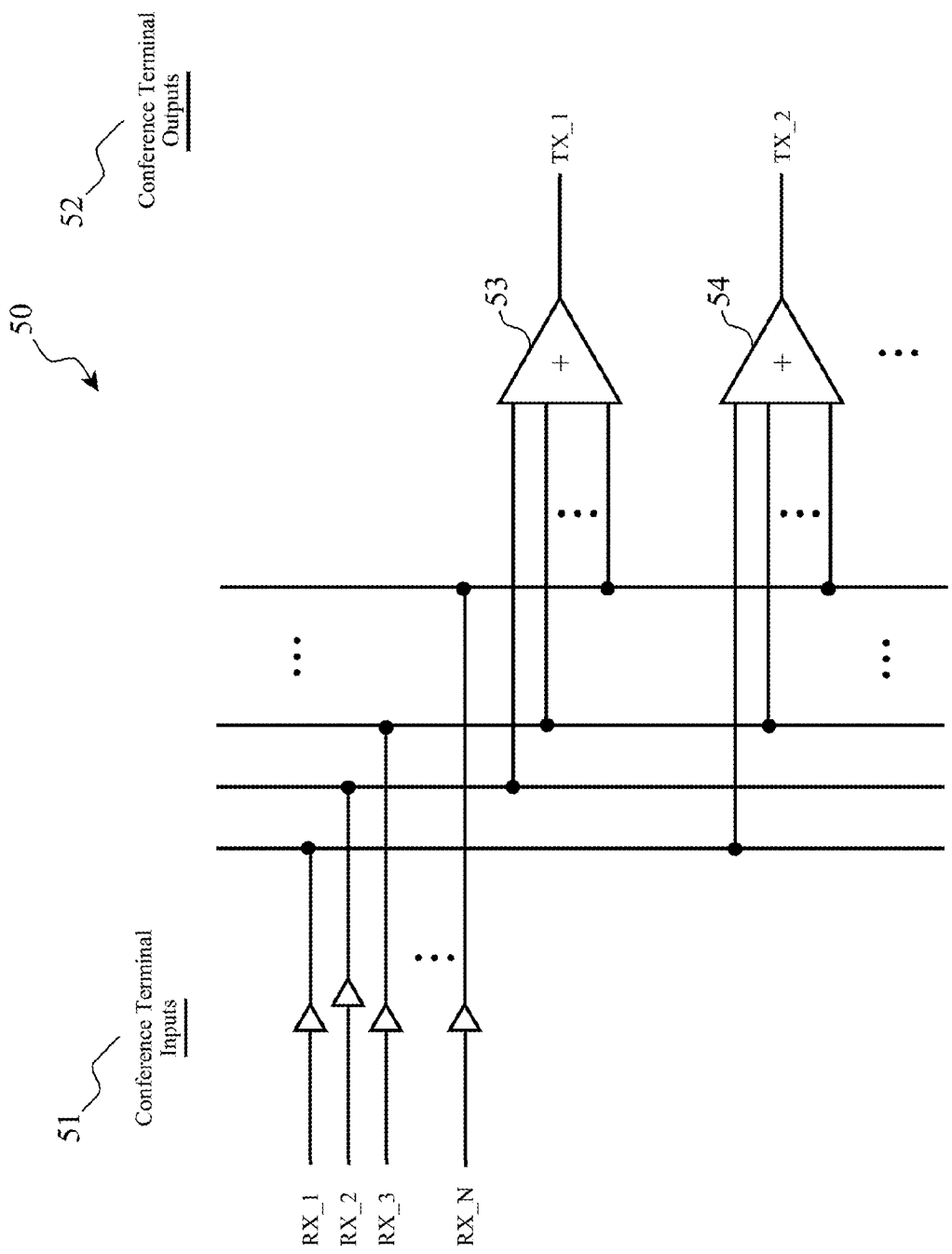
FIG. 5 depicts a functional approach to creating conference call signals.

Generally speaking, the conference bridge operates in one of two manners, the first of which is shown in FIG. 5. In this arrangement (50), the signals (51) from the microphones (or cameras), RX_1 through RX_N, from a number N of conferees are received by the conference bridge. To produce a signal to each conferee (52), the summation of all of the input signals from all conferees except the signal from the destination conferee is sent to each conferee. For example, the signal TX_1 sent to USER_1 includes the summation (53) of microphone signals from USER_2 through USER_N, but not the microphone signal from USER_1. Likewise, the signal TX_2 sent to USER_2 includes the summation (54) of microphone signals from USER_1 plus USER_3 through USER_N, but not the microphone signal from USER_2. This is done to avoid feedback or echos caused by sending the same signal back to the transmitter of the signal.

Figure 6:
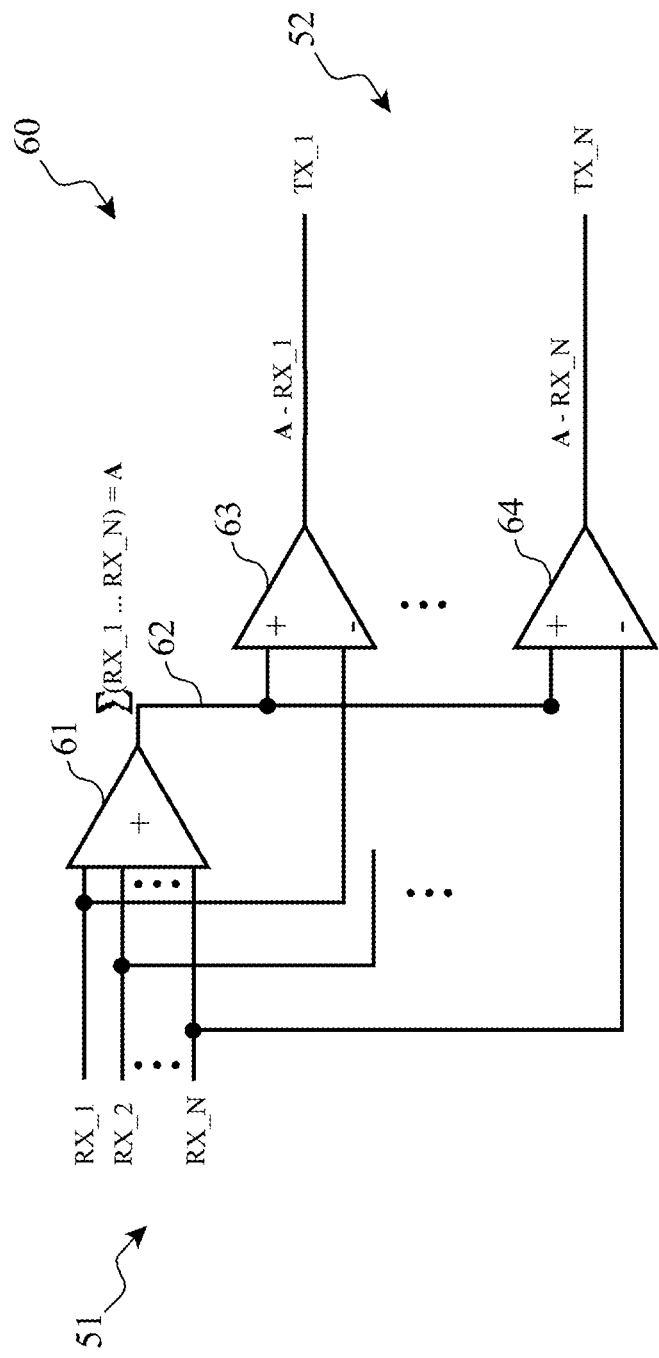
FIG. 6 depicts an alternative functional approach to creating conference call signals.

FIG. 6 shows an alternative implementation (60) of a conference bridge, in which all of the microphone signals (51) from all of the conferees are first summed, but the corresponding microphone signal is removed or subtracted out (63, 64) of the total summation (62) before sending speaker signals (52) to each conferee. For example, for a conference of N users, all microphone signals RX_1 through RX_N are summed (61) to produce a total signal A:

$$\Sigma(RX\_1 \ldots RX\_N) = A \qquad \text{(Eq. 1)}$$

Then, prior to delivery of this total signal A to a particular user, the microphone signal for that user is removed (63, 64) from the total signal A to yield the specific output signal for that user. For example, for USER_1, the signal TX_1 signal is computed as:

$$\begin{aligned} TX\_1 &= A - RX\_1 \\ &= \sum (RX\_1 \ldots RX\_N) - (RX\_1) \\ &= \sum (RX\_2 \ldots RX\_N) \end{aligned} \qquad \text{(Eq. 2)}$$

Likewise, the signal TX_2 sent from the conference bridge to USER_2 would be formed as:

$$\begin{aligned} TX\_2 &= A - RX\_2 \\ &= \sum (RX\_1 \ldots RX\_N) - (RX\_2) \\ &= \sum (RX\_1, RX\_3 \ldots RX\_N) \end{aligned} \qquad \text{(Eq. 3)}$$

Conference bridges often use custom circuits, such as Application Specific Integrated Circuits ("ASIC"), software, such as Digital Signal Processing methods, or combinations of both to achieve these signal computations.

Half- and Full-Duplex Telephones

Figure 7A:
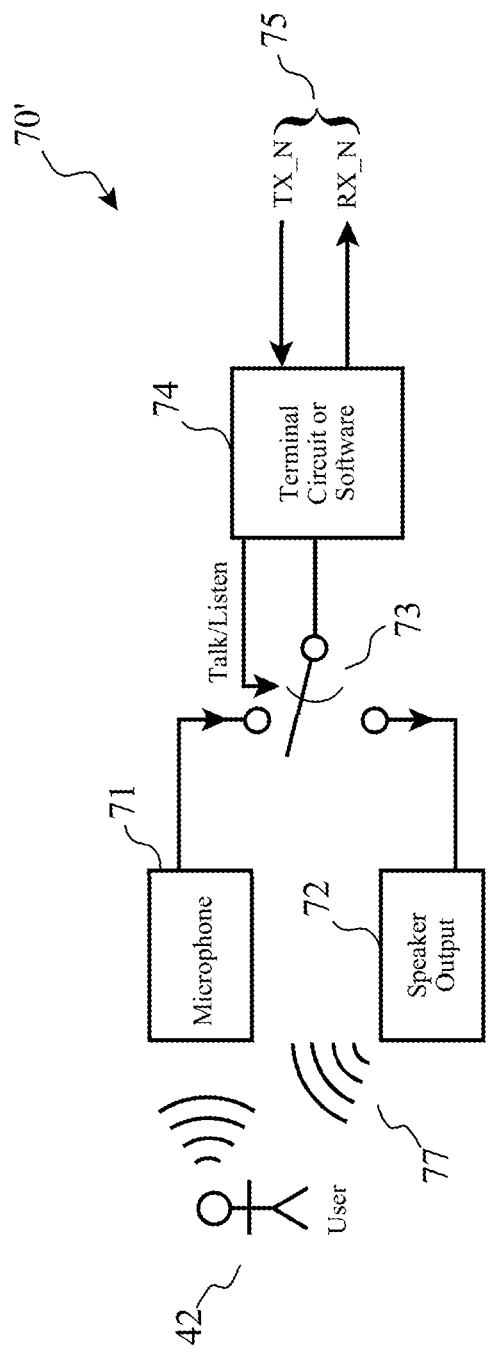
FIGS. 7a and 7b illustrate two functional configurations of typical telephone units used during conference calls.

Particularly problematic are conferences in which one or more of the conferees utilize a "half-duplex telephone", as shown in FIG. 7a. In this arrangement (70') of a terminal device while the user's transmission and reception signals (75) are part of a conference, the user (42) speaks into a microphone (71), and listens (77) to the conference on a speaker or acoustic transducer (72). For simplicity, the device's terminal circuit or software (74) only allows speaking or listening at any given time, but not both simultaneously. This is done often for cost savings, using a simple switch (73) to select the microphone or speaker operation. It is particularly difficult to interrupt a conferee using a half-duplex telephone for this reason: as he or she is speaking, his or her speaker is disconnected such that any audible attempt by other conferees is blocked from being heard by the speaking conferee.

Figure 7B:
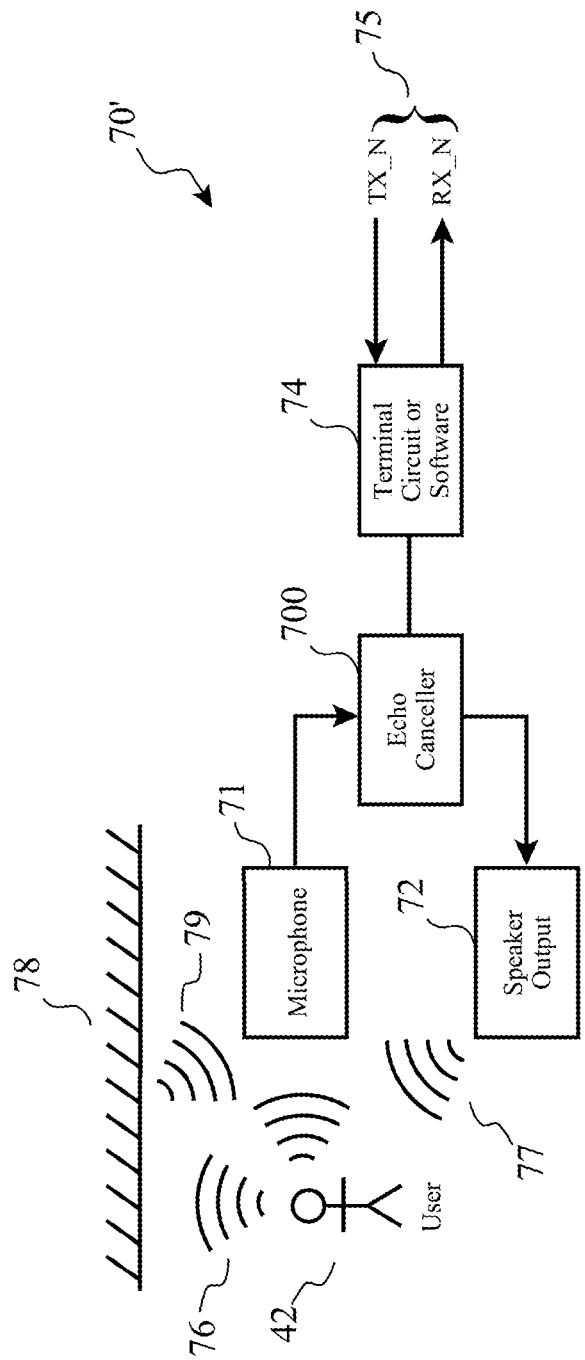

FIG. 7b shows a full-duplex (70') arrangement for a telephone, in which the talk/listen selector switch is functionally replaced with an echo canceller (700), in which the remaining elements (42, 74, and 77) are essentially unchanged from their previously-described functionality. An echo canceller removes the component of signal detected by the microphone (71) which represents a delayed and/or attenuated "copy" of the user's speech (76), such as an echo (79) from a wall or ceiling (78). In some situations, portions of the audible output from the speaker (72) are also detected by the microphone (71), which must be removed from the signal RX_N (75) sent to the conference bridge to avoid additional echo or feedback. Echo cancellers allow simultaneous listening and talking by a user, but add significant cost to a telephone unit.

Logical Processes of the Invention

To solve these problems, and to avoid the need to modify or upgrade millions of existing telephones, the logical processes of the present invention are preferably realized as additions to or enhancements of software and/or circuitry found in conference bridges. In this manner, the invention can be realized and deployed only to conference bridge systems, and legacy terminals can be employed while enjoying benefit of the invention.

Figure 1:
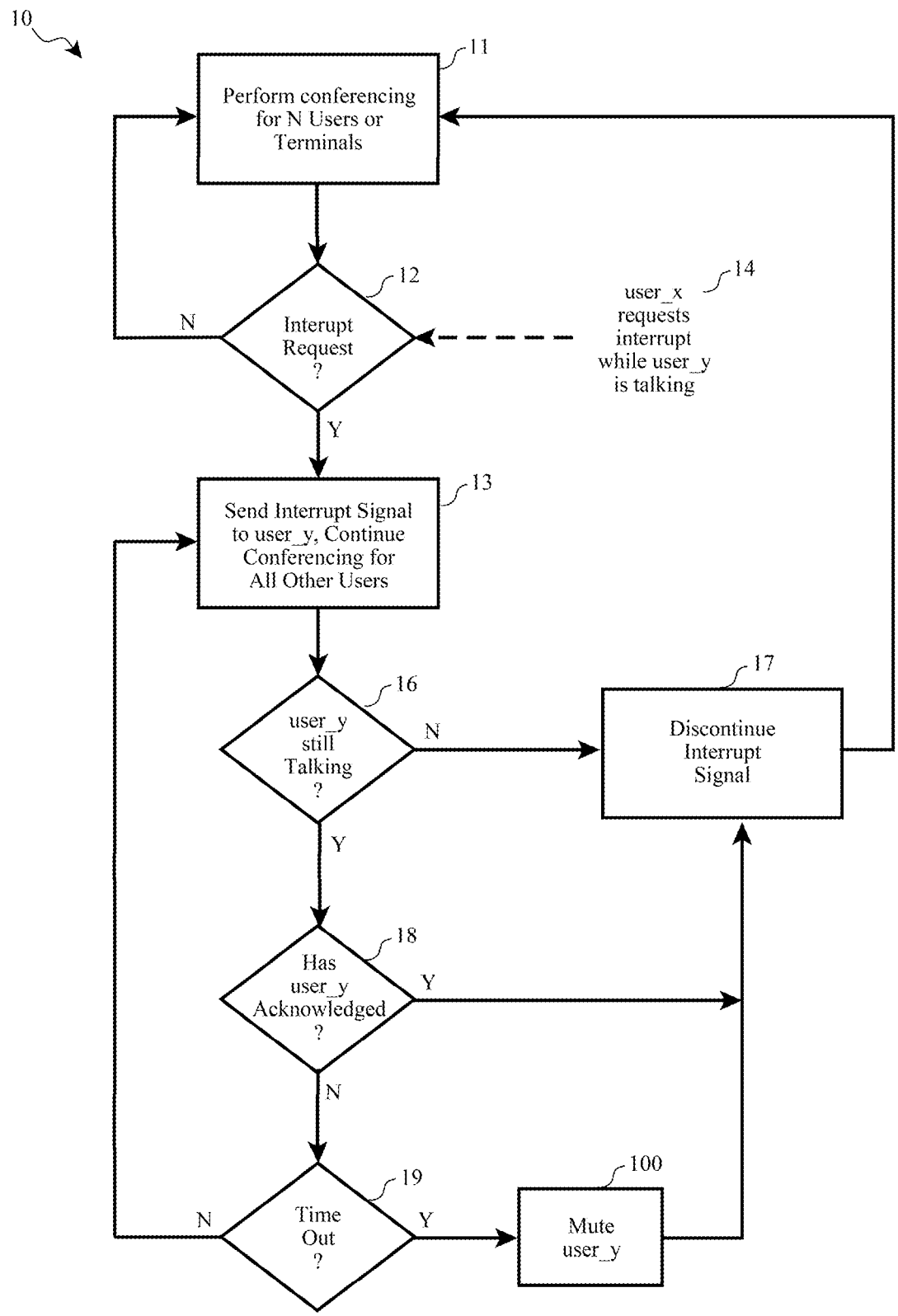
FIG. 1 illustrates a logical process according to the invention.

Turning to FIG. 1, a logical process (10) according to the invention is shown. Normal conference operations are performed (11), such as summation of signals as previously described, while also monitoring (12) the signal for the presence of an interrupt request signal (14), such as a specific combination of DTMF tones.

If a user presses the specific combination of DTMF keys while another user is speaking, this is detected (12), and an interrupt signal is sent (13) to the currently speaking conferee, but not to the other members. This can be done by summing the interrupt signal into the signal destined to the currently speaking conferee, or can be done by summing the interrupt signal into the total conference signal followed by subtracting it from each signal sent to a conferee who is not currently speaking.

For example, if USER_X wishes to request an interrupt while USER_Y is talking, USER_X may press a key combination such as *1, which is detected by the invention. The invention then sends (13) an alert tone or voice message (e.g. "Another Conferee has Requested to Talk") by summing the tone or voice recording into the TX_X signal, but not into other signals TX_Y, or TX1 ... TX_N. Alternatively, the alert tone or voice message may be summed into the total signal $$\Sigma(RX\_1 \ldots RX\_N, \text{alert\_tone}) \quad \text{(Eq. 4)}$$

followed by subtracting the alert tone or voice message signal from all signals to users who are not currently speaking:

$$TX\_Y=\Sigma(RX\_1 \ldots RX\_N, \text{alert\_tone})-(RX\_Y) \quad \text{(Eq. 5)}$$

$$TX\_X=\Sigma(RX\_1 \ldots RX\_N, \text{alert\_tone})-(RX\_X)-(\text{alert\_tone}) \quad \text{(Eq. 6)}$$

$$TX\_1=\Sigma(RX\_1 \ldots RX\_N, \text{alert\_tone})-(RX\_1)-(\text{alert\_tone}) \quad \text{(Eq. 7)}$$

$$TX\_2=\Sigma(RX\_1 \ldots RX\_N, \text{alert\_tone})-(RX\_2)-(\text{alert\_tone}) \quad \text{(Eq. 8)}$$

etc.

During this step, if an indicator of which user is currently speaking is not available from the rest of the conference bridge system, this determination can be made using a voice signal detector applied to each received microphone signal RX_1 through RX_N. Any received microphone signal which exceeds a certain threshold of voice-band energy can be declared as a "currently speaking conferee", to which an alert tone or message can be sent. This alternate embodiment allows the system to interrupt multiple simultaneous speakers. Alternatively, the received microphone signal with the greatest voice energy can be determined as the currently speaking conferee, to which the interrupt alert tone or message is sent.

As long as the currently speaking conferee is still speaking (16), the invention continues to transmit (13) the alert tone. This allows the requesting user to discontinue pressing the DTMF key combination, but keeps the signal in transmission to the currently speaking conferee in order to maximize the chance of hearing it, such as the situation while a conferee talks into a half-duplex telephone.

When the currently speaking conferee stops talking as determined by a voice energy monitor applied to the currently speaking conferee's microphone signal, the interrupt alert tone or message is discontinued (17), and normal conference operation continues (11), which produces an opportunity of quiet for another conferee to speak.

Optionally, the invention provides a capability of the currently speaking conferee to acknowledge the interrupt request, but to continue speaking This is useful for situations where the currently speaking conferee, such as a class leader or presenter, would like to finish a train of thought or conversation before yielding the floor to the requester. But, through the acknowledgment, the requester knows his or her request has been received, and repeated requests are not necessary. So, if the currently speaking conferee acknowledges the request (18), such as by pressing a predetermined DTMF key combination such as *#, the interrupt alert tone or message is discontinued (17), and the acknowledgment is sent to the requester. Acknowledgment may take the form of another tone, or another recorded voice message, such as "The currently speaking conferee has received your request".

In yet another optional embodiment, a maximum time to speak following a request can be enforced automatically by the invention. By initiation of a timer upon detection (12) of an interrupt request, if the currently speaking conferee does not yield the floor (e.g. go silent) (19) by the time the timer expires, then the microphone signal from the currently speaking conferee is automatically removed from the conference total signal, effectively muting (100) the currently speaking conferee and allowing a quiet period during which other conferees may speak.

Illustration of Operation of the Invention

For example, while USER_Y is talking, all conferees, except the currently speaking conferee, receive USER_Y's speech signal.

Another user, such as USER_X, may temporally make an interrupt request, such as pressing *1 DTMF keys, which is detected by the enhanced conference bridge. The conference bridge then transmits an interrupt alert tone or message only to the currently speaking conferee, USER_Y, for a period of time $T_i$ until such time as USER_Y stops talking, and acknowledgment signal is received from USER_Y, or a timeout occurs.

At the end of period $T_i$, normally a short period of silence $T_s$ will ensue, following which another user, such as USER_X, will begin speaking. This signal will then be broadcast to all other conferees, except for USER_X, as previously described.

Suitable Computing Platform

The invention is preferably realized as a feature or addition to the software already found present on well-known computing platforms such as personal computers, web servers, and web browsers, and in well known conference bridges.

These common computing platforms and conference bridges can include personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 2A:
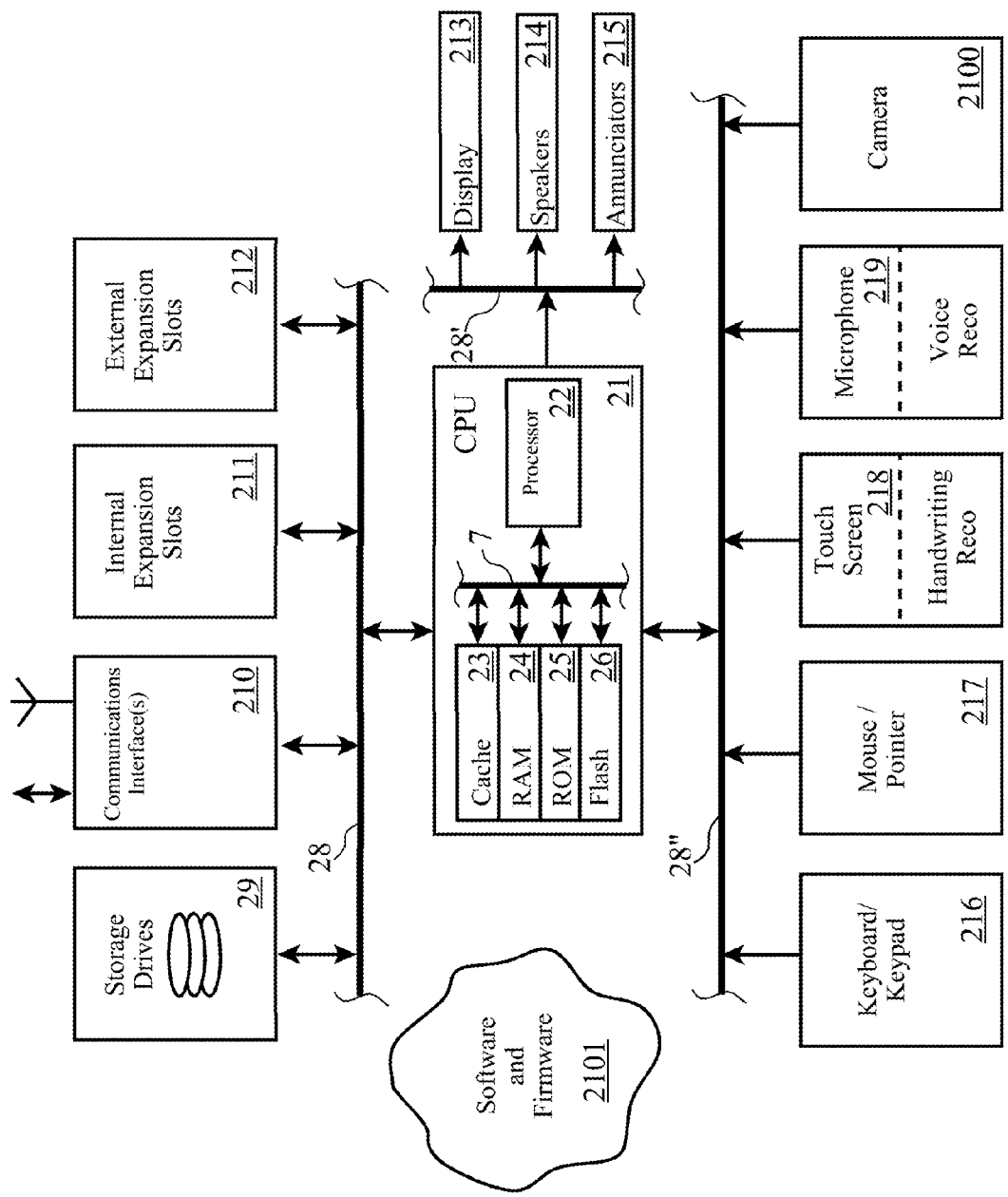
FIGS. 2a and 2b shows a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (7) between the microprocessor (22) and the various types of CPU memory is often referred to as a "local bus", but also may be a more generic or industry standard bus.

Many computing platforms are also provided with one or more storage drives (29), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
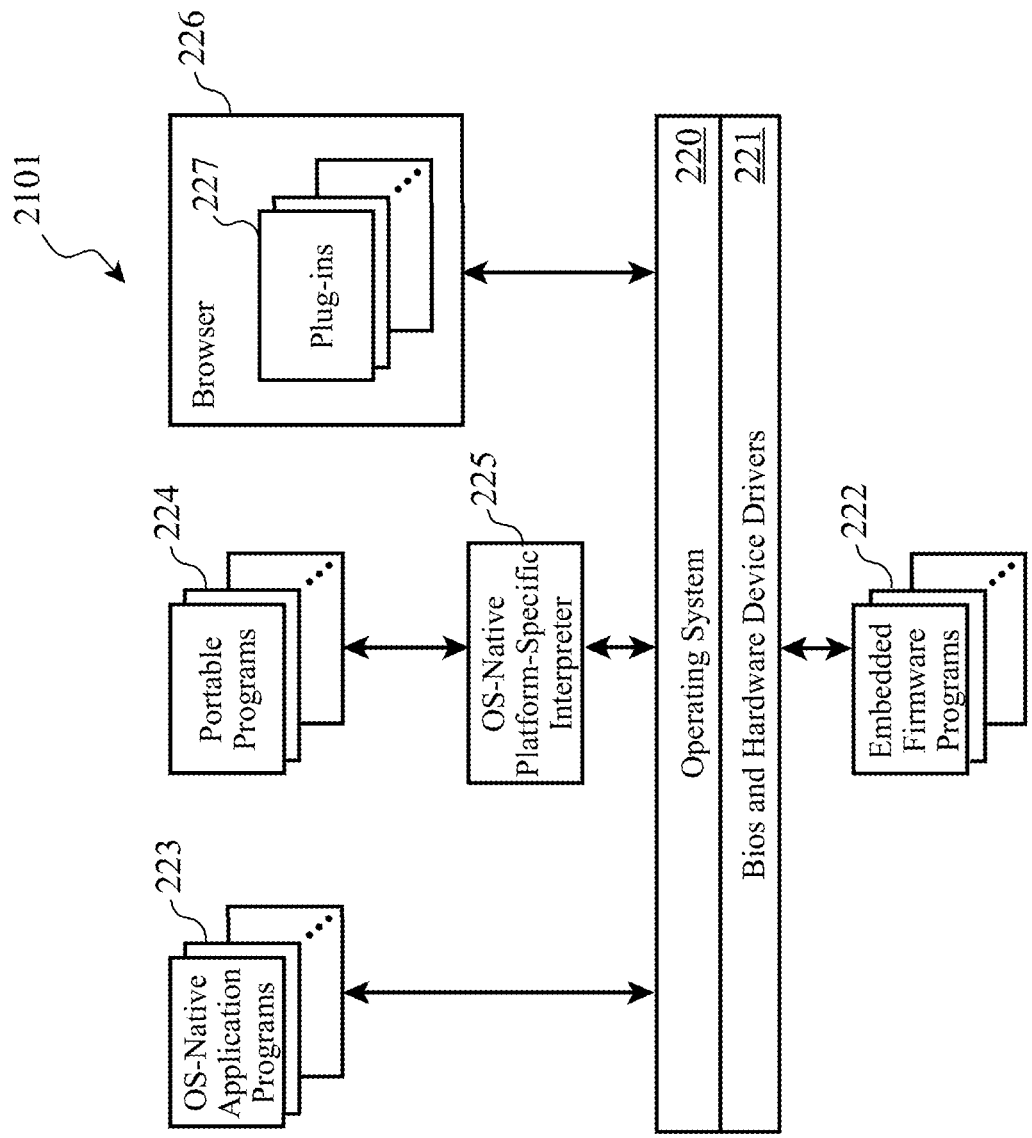

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2 ™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

CONCLUSION

The present invention has been described, including several illustrative examples. It will be recognized by those skilled in the art that these examples do not represent the full scope of the invention, and that certain alternate embodiment choices can be made, including but not limited to use of alternate programming languages or methodologies, use of alternate computing platforms, and employ of alternate communications protocols and networks. Therefore, the scope of the invention should be determined by the following claims.

What is claimed is:

1. A method of controlling a conference call comprising:
   during an unmoderated conference call, receiving by a conference call controller an in-band acknowledgment signal from a speaking conferee terminal indicating acknowledgment of an in-band interrupt request signal, wherein the in-band acknowledgment signal is independent of rejection or acceptance by a currently speaking conferee of the interrupt request signal;
   transmitting by the conference call controller an in-band acknowledgment signal to a non-speaking conferee terminal without sending the in-band acknowledgment signal to other conferee terminals in the unmoderated conference call, and without changing muting states of the non-speaking conferee terminal and of the speaking conferee terminal;
   sending by the conference call controller an in-band alert signal to the speaking conferee terminal until detecting that the currently speaking conferee has taken a predetermined action via the speaking conferee terminal, wherein the in-band alert signal indicates a continuing request to speak and is independent of a muting state of the non-speaking conferee terminal; and
   responsive to detecting by the conference call controller that the currently speaking conferee has taken the predetermined action, discontinuing sending by conference call controller the in-band alert signal;
   wherein the conference call controller comprises a computer system, or an electronic circuit for performing call conference control, or a combination of the computer system and the electronic circuit.

2. The method as set forth in claim 1 wherein the sending of the alert signal comprises sending the alert signal until relative silence is detected on a microphone signal received from said currently speaking conferee.

3. The method as set forth in claim 1 wherein the sending of the alert signal comprises sending the alert signal until at least one event is detected selected from the group consisting of detecting an acknowledgment signal on a microphone signal received from the currently speaking conferee, and elapse of a maximum time from a time of beginning to send the alert signal.

4. The method as set forth in claim 3 wherein the acknowledgment signal on the microphone signal comprises one or more dual-tone multi-frequency signals.

5. The method as set forth in claim 3 further comprising, in response to the maximum time elapsing, removing a microphone signal component associated with the speaking conferee terminal from summations of signals provided to other conferee terminals in order to mute the speaking conferee terminal.

6. The method as set forth in claim 1 wherein the in-band interrupt request signal comprises a signal selected from the group consisting of a dual-tone multi-frequency signal and a spoken command detected by a voice recognition resource.

7. The method as set forth in claim 1 wherein the alert signal comprises a signal selected from the group consisting of an audible tone, and an audible voice recording.

8. A computer program product for controlling a conference call, the computer program product comprising a tangible, computer-readable storage memory device having program code embodied therewith, the program code comprising:
   program code for, during an unmoderated conference call, receiving by a conference call controller an in-band acknowledgment signal from a speaking conferee terminal indicating acknowledgment of an in-band interrupt request signal, wherein the in-band acknowledgment signal is independent of rejection or acceptance by a currently speaking conferee of the interrupt request signal;
   program code for transmitting by the conference call controller an in-band acknowledgment signal to a non-speaking conferee terminal without sending the in-band acknowledgment signal to other conferee terminals in the unmoderated conference call, and without changing muting states of the non-speaking conferee terminal and of the speaking conferee terminal;
   program code for sending by the conference call controller an in-band alert signal to the speaking conferee terminal until detecting that the currently speaking conferee has taken a predetermined action, wherein the in-band alert signal indicates a continuing request to speak and is independent of a muting state of the non-speaking conferee terminal; and
   program code for, responsive to detecting by the conference call controller that the currently speaking conferee has taken the predetermined action, discontinuing sending by the conference call controller the in-band alert signal;
   wherein the conference call controller comprises a computer having a processor for executing program code, or an electronic circuit for performing a logical process, or a combination of the processor, the program code, and the electronic circuit.

9. The computer program product as set forth in claim 8 wherein the program code for sending of the alert signal comprises program code for sending until relative silence is detected on a microphone signal received from said currently speaking conferee.

10. The computer program product as set forth in claim 8 wherein the program code for sending of the alert signal comprises program code for sending until at least one event is detected selected from the group consisting of detecting an acknowledgment signal on a microphone signal received from the currently speaking conferee, and elapse of a maximum time from a time of beginning to send the alert signal.

11. The computer program product as set forth in claim 10 wherein the acknowledgment signal on the microphone signal comprises one or more dual-tone multi-frequency signals.

12. The computer program product as set forth in claim 10 further comprising program code embodied with the tangible, computer-readable storage memory device for, in response to the maximum time elapsing, removing a microphone signal component associated with the speaking conferee terminal from summations of signals provided to other conferee terminals in order to mute the speaking conferee terminal.

13. The computer program product as set forth in claim 8 wherein the in-band interrupt request signal comprises a signal selected from the group consisting of a dual-tone multi-frequency signal and a spoken command detected by a voice recognition resource.

14. The computer program product as set forth in claim 8 wherein the alert signal comprises a signal selected from the group consisting of an audible tone, and an audible voice recording.

15. A system for controlling a conference call comprising:
   a first receiver portion of a conference call controller for, during an unmoderated conference call, receiving an in-band acknowledgment signal from a speaking conferee terminal indicating acknowledgment of an in-band interrupt request signal, wherein the in-band acknowledgment signal is independent of rejection or acceptance by a currently speaking conferee of the interrupt request signal;

a first transmitter portion of a conference call controller for transmitting an in-band acknowledgment signal to a non-speaking conferee terminal without sending the in-band acknowledgment signal to other conferee terminals in the unmoderated conference call, and without changing muting states of the non-speaking conferee terminal and of the speaking conferee terminal; and a first sender portion of the conference call controller for sending by the conference call controller an in-band alert signal to the speaking conferee terminal until detecting that the currently speaking conferee has taken a predetermined action, wherein the in-band alert signal indicates a continuing request to speak and is independent of a muting state of the non-speaking conferee terminal, and for, responsive to detecting by the conference call controller that the currently speaking conferee has taken the predetermined action, discontinuing sending by the conference call controller the in-band alert signal;

wherein the conference call controller comprises a computer having a processor for executing program code, or an electronic circuit for performing a logical process, or a combination of the processor, the program code, and the electronic circuit.

16. The system as set forth in claim 15 wherein the sending of the alert signal comprises sending until relative silence is detected on a microphone signal received from said currently speaking conferee.

17. The system as set forth in claim 15 wherein the sending of the alert signal comprises sending until at least one event is detected selected from the group consisting of detecting an acknowledgment signal on a microphone signal received from the currently speaking conferee, and elapse of a maximum time from a time of beginning to send the alert signal.

18. The system as set forth in claim 17 wherein the acknowledgment signal comprises one or more dual-tone multi-frequency signals.

19. The system as set forth in claim 17 further comprising, in response to the maximum time elapsing, removing a microphone signal component associated with the speaking conferee terminal from summations of signals provided to other conferee terminals in order to mute the speaking conferee terminal.

20. The system as set forth in claim 15 wherein the in-band interrupt request signal comprises a signal selected from the group consisting of a dual-tone multi-frequency signal and a spoken command detected by a voice recognition resource.

21. The system as set forth in claim 15 wherein the alert signal comprises a signal selected from the group consisting of an audible tone, and an audible voice recording.

* * * * *